United States Patent [19]

Argentieri et al.

[11] 4,135,143

[45] Jan. 16, 1979

[54] AIRCRAFT ALTITUDE ANNUNCIATOR

[75] Inventors: Michael A. Argentieri, West Orange; James G. Lionetti, Northvale, both of N.J.

[73] Assignee: Intercontinental Dynamics Corporation, Englewood, N.J.

[21] Appl. No.: 696,032

[22] Filed: Jun. 14, 1976

[51] Int. Cl.² .............................................. G08G 5/00
[52] U.S. Cl. ............................. 340/27 R; 340/27 AT; 340/181; 340/692; 360/12
[58] Field of Search ............... 340/27 R, 27 AT, 221, 340/181; 360/12; 244/180; 73/178 R, 178 T; 235/150.2, 150.22; 364/433, 434

[56] References Cited

U.S. PATENT DOCUMENTS

| | | | |
|---|---|---|---|
| 3,538,264 | 11/1970 | Van Dyke | 340/27 R |
| 3,582,949 | 6/1971 | Forst | 340/27 R |
| 3,668,621 | 6/1972 | Boyd | 340/27 R |
| 3,715,718 | 2/1973 | Astengo | 340/27 R |
| 3,925,751 | 12/1975 | Bateman | 340/27 R |
| 3,988,713 | 10/1976 | Bateman | 340/27 R |

Primary Examiner—John W. Caldwell, Sr.
Assistant Examiner—James J. Groody
Attorney, Agent, or Firm—Gottlieb, Rackman & Reisman

[57] ABSTRACT

There is disclosed an annunciator for verbalizing altitude-related messages during the descent of an aircraft. Announcements such as "nine hundred," "eight hundred," etc. are made as the aircraft descends through respective "hundreds" levels; such announcements are not made during an ascent. In addition, the word "terrain" is heard when the aircraft descends through the 2,000-foot and 1,000-foot levels, and the word "minimum" is heard when the aircraft drops below a "decision height" selected by the pilot. Lastly, the word "glideslope" is out-putted in response to the detection of a glideslope deviation, the frequency of this announcement as well as its volume being a function of the magnitude of the deviation.

61 Claims, 7 Drawing Figures

AIRCRAFT ALTITUDE ANNUNCIATOR

This invention relates to aircraft altimeters, and more particularly to annunciators for use therewith.

There are numerous types of aircraft altimeter displays which are marketed by different companies both in this country and in others. An improved display device, one with which the present invention finds advantageous use, is the "Integrated Radar-Pneumatic Altimeter Display Device" disclosed in Argentieri et al. U.S. Pat. No. 3,890,614 issued on June 17, 1975. In that device, within a single display structure, both the barometrically-derived altitude and the radio-derived altitude are displayed. The Argentieri et al display device is marketed under the trademark RAD/BAR by the assignee of this application.

Audible, and especially verbal, alarms or announcements would be highly advantageous in an aircraft environment. They not only would serve as an alternate information source for the pilot, particularly when he is not looking at the altimeter display, but they would also alert him in emergency situations when his attention is focused elsewhere.

It is a general object of our invention to provide altitude-related verbal announcements for the pilot of an aircraft.

It is another object of our invention to provide an annunciator which, while it can be integrated with the display device, is functionally independent of it and is responsive directly to the same type of altitude-related signals which control the operation of the display device.

In the design of an aircraft altitude annunciator, it must be decided which types of announcements are to be made, how many different announcements should be made, and how often they should be made. For example, there is little need for verbal announcements at relatively high altitudes, e.g., above 2,000 feet. The announcements have greatest value at low altitudes, but too frequent announcements may so condition the pilot that he ignores them altogether. Announcing every ten-foot change in altitude, for example, would be self-defeating. Moreover, altitude-related announcements are of little value during the ascent of an aircraft, and are primarily useful during a landing approach. By preventing announcements from being made during an ascent, when they serve little useful function anyway, any message heard by the pilot alerts him to the fact that the aircraft is descending (or the terrain is rising). For this reason, in accordance with the principles of our invention, verbal announcements are made only during terrain closure with the aircraft, and preferably under control of the radio-derived altitude signal which is more accurate than barometric altitude at relatively low altitudes. A limited number of announcements are made, and at intervals which are not so frequent that they condition the pilot to ignore them.

In the illustrative embodiment of our invention, 12 different announcements are made. The word "terrain" is heard when the aircraft descends through both the 2,000-foot level and the 1,000-foot level. As the aircraft descends past the 900-foot, 800-foot, etc. levels all the way down past the 100-foot level, nine different numerical announcements are heard: "nine hundred," "eight hundred," ... "one hundred." Display devices, such as the RAD/BAR device mentioned above, often include provision for the pilot to select a "decision height," an altitude which when reached results in the generation of an alarm signal. When the decision height is reached during descent of the aircraft, the annunciator of our invention announces the word "minimum." (Since the setting of the decision-height level is at the option of the pilot, the word "minimum," or some equivalent message, is verbalized rather than the numerical altitude.

Lastly, the message "glideslope" is called out when a deviation from the glideslope is detected by a conventional glideslope receiver. As long as a true deviation persists, this announcement is heard repetitively. But the rate at which the announcement is heard, as well as its sound level, is a function of the extent of the deviation.

As will be described in detail below, the system includes a priority structure. For example, the announcement "minimum" is more important than an announcement such as "two hundred," etc.; the "minimum" announcement has the highest priority. There are also other priorities, as well as certain lock-out features. For example, conventional glideslope receivers provide an indication whether the equipment is working properly, and if a valid glideslope signal is not being generated, then the "glideslope" announcements are inhibited.

Announcements are generated only during a descent; in the usual case there is little need to audibly inform the pilot of increasing altitudes. Thus for the proper operation of the annunciator, a mechanism must be provided for determining that the aircraft is indeed descending. The vertical rate of movement can be determined by differentiating the altitude signal, a negative rate exceeding a threshold level being assumed to represent a descent condition. However, this simple approach is not the best because differentiators are inherently noisy and can give rise to false descent indications. Another approach is to derive an average of the negative rate signal, taken over a time interval several seconds long; only if the average negative rate signal exceeds a threshold level does the system assume that the aircraft is descending. But this approach also has its problems; during the several seconds that it takes to verify that the aircraft has started to descend, an announcement that should otherwise be heard may not be.

To make the system relatively immune to circuit noise, and yet in order to make the system sensitive to "trend" (descent) information which does not depend on measurements taken over an excessive time interval, a different approach is preferred. A sampling of the altitude reading is taken every four seconds. The instantaneous altitude is continuously subtracted from the last-taken sample, and whenever there is a one-foot difference the system assumes that a descent is in progress. Thus a descent is detected almost as soon as it begins. However, the descent-indicating signal (referred to herein as the "negative-rate" signal) is not cut off on such an instantaneous basis. The difference must be less than 1-foot (or even of opposite sign) for approximately 1.5 seconds before the signal is cut off.

When flying over a hole in the terrain, for example, which is reflected in the radio altitude signal as an ascent, the negative-rate signal persists for 1.5 seconds; the momentary increase in the altitude signal — which really reflects terrain "noise" rather than a true ascent — is "filtered out" provided the condition does not persist for longer than 1.5 seconds. On the other hand, when flying over a building the altitude signal suddenly decreases and this does result in the instantaneous generation of the negative-rate signal. Since hitting a building is just as fatal as hitting the ground, terrain "noise" is not "filtered out" if it results in a decrease in the altitude signal.

The system logic is digital in nature; thus the radio signal altitude which is analog in form is converted to digital form before subsequent processing. The analog-to-digital converter which is used for this function may be the same one which controls the visual display. For a pleasing "flickerless" display which is up-dated as often as can be practically useful, we have found that the A/D converter output should be up-dated at 0.4-second intervals. The A/D converter derives only "hundreds" and "tens" digits; the "units" digit is ingored except that the altitude is rounded out to the nearest "tens" digit.

Theoretically, a numerical announcement should be made only if two conditions exist simultaneously. First, the negative-rate signal must be present. Second, the radio altimeter signal must go through a "zero crossing," i.e., the altimeter reading must change, for example, from above 700 feet to below 700 feet. Such a condition is most easily detected by determining when the "tens" digit at the A/D output is 0. But if one A/D conversion takes place when the altitude is 710 feet and the next (0.4 seconds later) takes place when the altitude is 694 feet (690 feet when rounded out to the nearest "tens" digit), a not unusual rate, the zero crossing will be missed and the "seven hundred" announcement will not be made.

For this reason, a zero crossing is assumed to occur whenever the "tens" digit at the output of the A/D converter switches to 2, 1 or 0. The only way that a zero crossing can be missed is if the aircraft drops 30 feet or more in 0.4 seconds. This corresponds to a descent of 4500 feet/minute, a very high final descent rate. The skipping of a number actually adds emphasis to the high rate.

To avoid unnecessary multiple announcements of the same altitude (in 100-foot increments), the logic is designed such that a descent through any 30-foot range above a "hundreds" level, only one announcement is made. Variations in altitude within the 30-foot range do not generate numerical messages. Even a descent below the hundreds level, followed by an ascent into the range and another descent, does not trigger a message. A message is generated only during a descent, when one of the 30-foot ranges is first entered from above.

This early detection of a zero crossing (at an altitude of up to 24 feet above a true hundreds level, since at this level the A/D "tens" output switches from 3 to 2) provides an additional advantage. As will be described below, messages may be generated only at the start of successive 1-second intervals. The early detection of a zero crossing compensates for the up-to-one-second lag in the start of a message, so that the "hundreds" message which is generated is actually heard closer in time to the true zero crossing.

There are other features of the system which are important from a human engineering standpoint. For example, "glideslope" announcements are inhibited at altitudes below the decision height and above 1,000 feet for reasons which will be described below. Also, if the aircraft falls from above 700 feet, for example, to below 500 feet very rapidly, after the "700" announcement the "500" announcement will be heard. The "600" announcement, which has become irrelevant, is locked out until the "700" announcement has been completed.

The presence of the negative-rate signal is necessary only to trigger numerical announcements. The "minimum" message, for example, is heard even if the descent is so slow that the negative-rate signal is not developed. Passage through the decision height is such an important event, that the only condition for triggering the "minimum" message is that the radio altitude go below the pre-set decision height. The "terrain" and "glideslope" announcements are similarly independent of the negative-rate signal. Also, as will become apparent below, at the end of any message, any other announcement-worthy events which were detected during play of the last message are ignored; the event-registering devices are reset. (It is by doing this that after the "700" message the "500" message can be heard, to the exclusion of the "600" message, if appropriate.) An exception to this is the "minimum" message. A descent through the decision height is registered when it occurs. As soon as the message in progress (if any) is heard, the "minimum" announcement is made.

Further objects, features and advantages of the invention will become apparent upon consideration of the following detailed description in conjunction with the drawing, in which.

Figure 1:
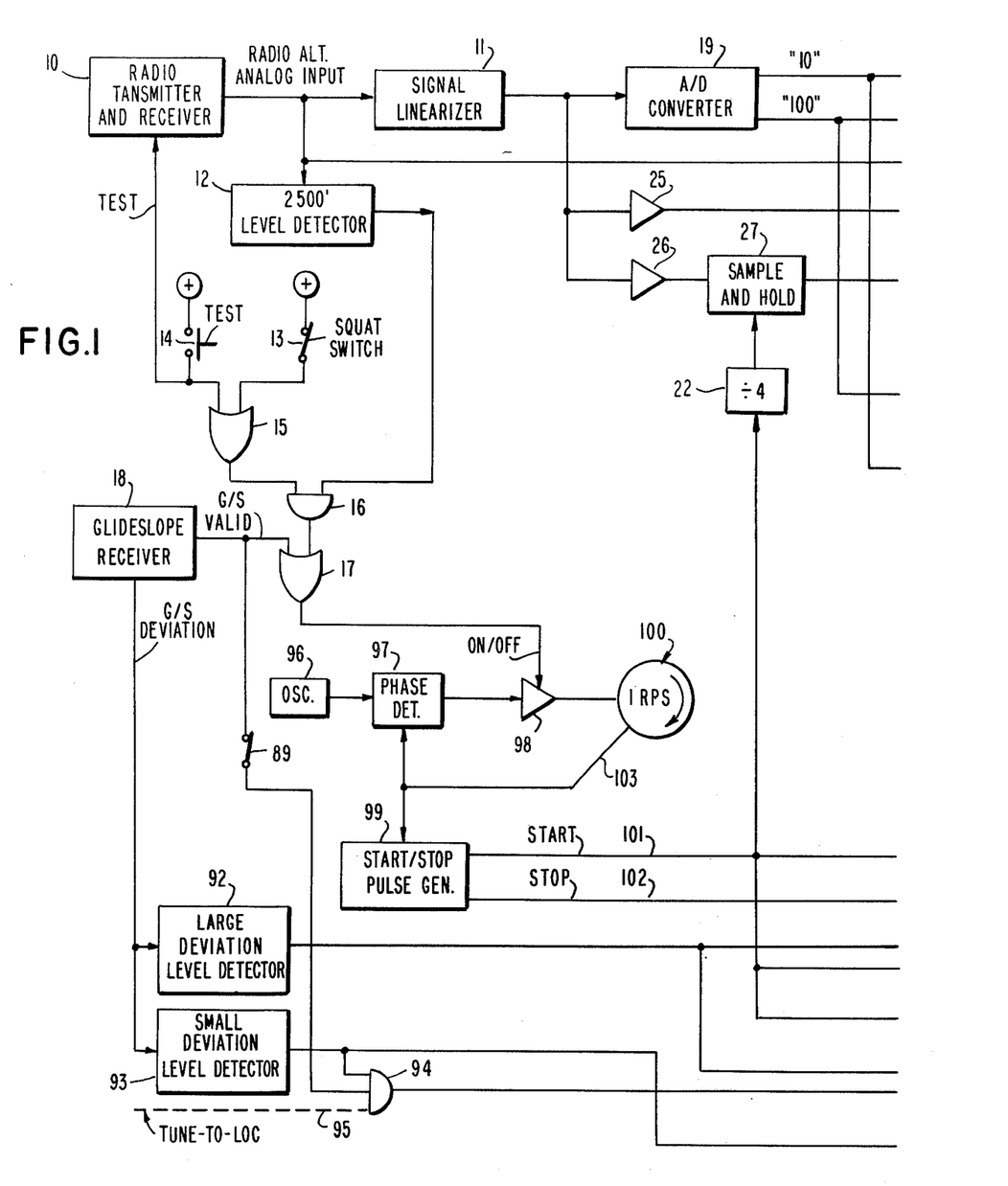
FIGS. 1–3, arranged as shown in FIG. 4, depict the logic of the illustrative embodiment of the invention.
Figure 2:
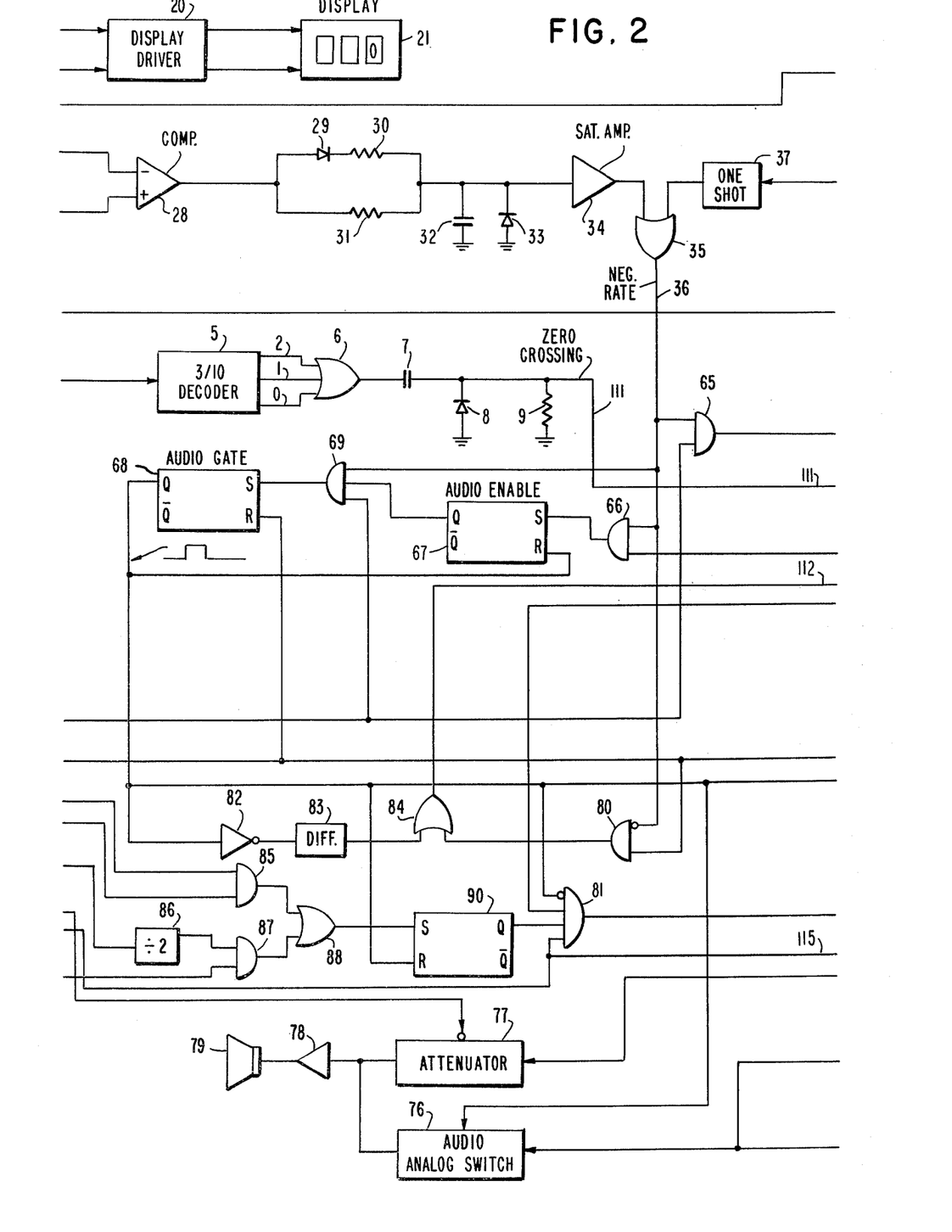
Figure 3:
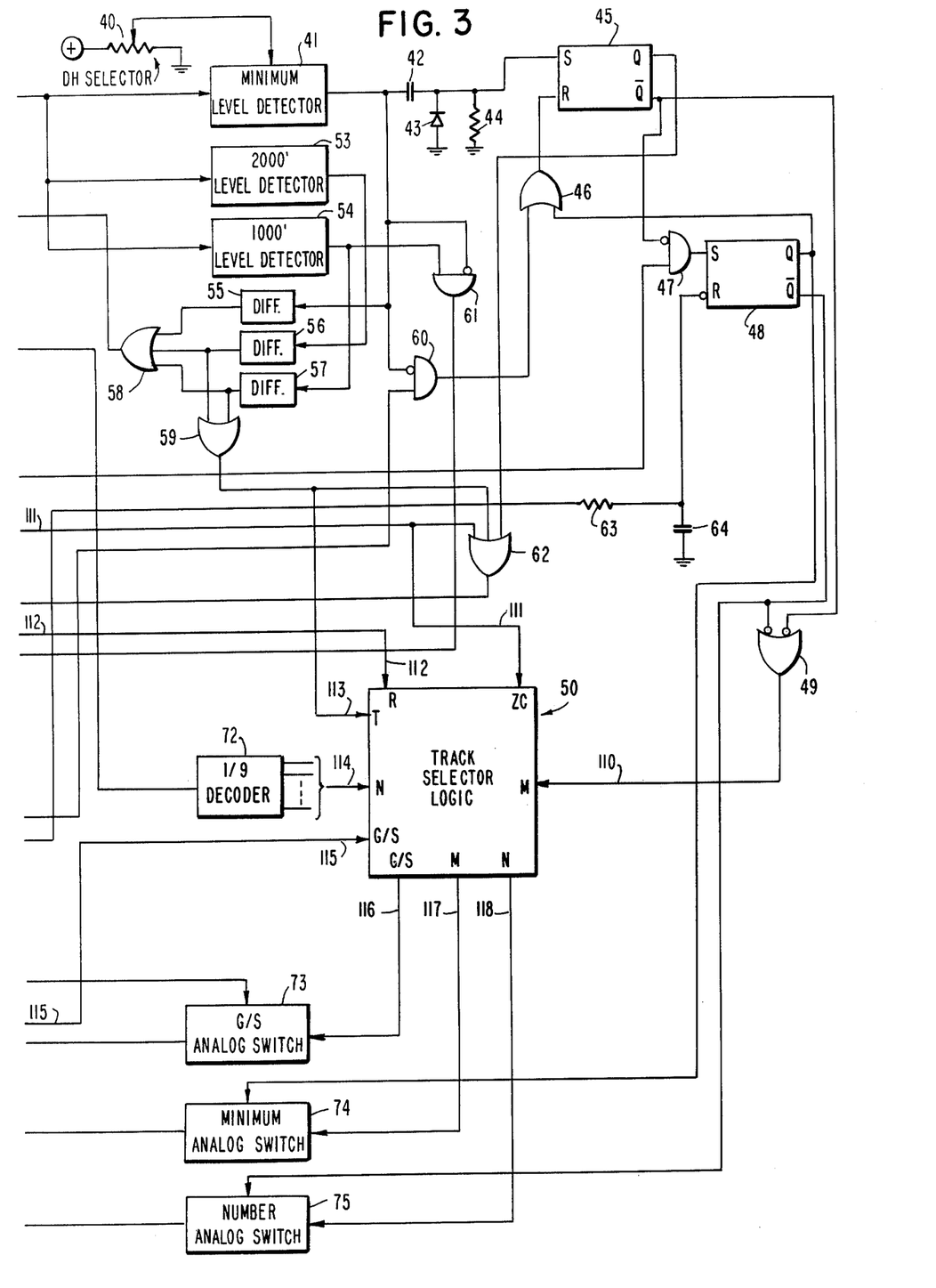
Figure 4:
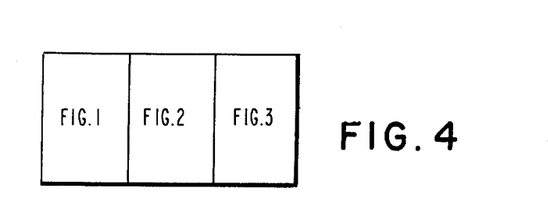

Radio transmitter and receiver 10 depicts a conventional aircraft radio (or radar) system for deriving an analog signal which represents a radio-derived altitude. The radio altitude analog signal generated by the instrument serves as an input to the system of our invention.

Level detector 12 energizes its output when the altitude represented by the analog input is 2500 or less. No announcements are made at altitudes above 2000 feet, and as long as the aircraft is above the 2500-foot level there is no reason to turn on the message-generating system. It is only when the aircraft is flying at relatively low altitudes that the message-generating system is enabled as the output of level detector 12 goes high to energize one input of AND gate 16.

The other input of the AND gate is connected to the output of OR gate 15. One of the inputs of the OR gate is connected to "squat" switch 13. This switch is contained in the landing gear and is open only when the aircraft is on the ground. At this time there is no need for messages to be generated and the message-generating system is held off. But as long as the aircraft is in the air, OR gate 15 operates so that if the aircraft is below 2500 feet, the output of AND gate 16 goes high. The signal is transmitted through OR gate 17 to turn on the message-generating system.

The only exception to the general rule that messages are not required when the aircraft is on the ground is when the radio transmitter and receiver is tested. An aircraft equipped with such an instrument usually includes a test button which, when operated, cycles the instrument rapidly so that the radio altitude analog signal furnished by the instrument rapidly cycles through its normal range. When the test button 14 is operated to energize the test input of the radar instrument 10, the other input of OR gate 15 is energized, even though squat switch 13 may be open. The message-generating system is turned on; as long as the radio transmitter and receiver is being tested, the annunciator of the invention can also be tested, using the artificially-generated radio altitude analog signal as the input. (During the test sequence, the radio altitude analog signal changes so rapidly that only one message is actually heard. As will become apparent below, the "minimum" message has the highest priority and even though all of the circuits which register the need to make respective announcements operate almost simultaneously as the radio altitude analog signal rapidly cycles from one end of its range to the other, it is the "minimum" message which is heard so as to inform the pilot that the annunciator is working.)

It is possible for the radio transmitter and receiver 10 to fail in its operation during a flight. In such a case, the numerical-value and "minimum" messages may not be generated or, if they are, they may not be meaningful messages. But glideslope information is usually derived from another instrument, depicted by numeral 18 in the drawing. The glideslope receiver 18 generates two signals, one of which represents the actual deviation from the glideslope path (G/S DEVIATION) and the other of which represents that the glideslope receiver is operating properly (G/S VALID). The latter signal is extended to the other input of OR gate 17. Consequently, even though AND gate 16 may not operate if the radio transmitter and receiver 10 fails, the output of OR gate 17 still remains high to enable the message-generating system so that at least "glideslope" messages can be heard.

As will be described below, the 12 messages are recorded on a disc 100 which rotates at a speed of 1 revolution per second. The disc contains 13 tracks, 12 of which have messages and the outer one of which is a timing track. The timing track contains 100 pulses recorded on it, as well as start and stop indications. Oscillator 96 has a frequency of 100 pulses per second. The output of the oscillator is applied to one input of phase detector 97. The outer input of the phase detector is derived from the circuitry which reads the timing pulses in the outer track of the disc, the pulses being transmitted over conductor 103. The phase detector compares the speed of the disc (i.e., the rate of the timing pulses) with the frequency of the oscillator, and generates an output which, after amplification by amplifier 98, drives the disc so that it rotates at the desired speed of 1 revolution per second. The output of OR gate 17 is connected to the on/off input of the amplifier; it is only when messages are to be generated that amplifier 98 is turned on. Otherwise, the amplifier remains off so that the disc does not turn.

The timing signals transmitted over conductor 103 to phase detector 97 are also applied to the input of start-/stop pulse generator 99. This pulse generator simply isolates the start and stop timing signals on the outer track and generates respective start and stop pulses on conductors 101 and 102. These pulses control the operation of the logic system, as will be described below. The two pulses are arranged on the disc such that the start pulse is generated on conductor 101 just prior to the beginning of all 12 announcements reaching their respective read heads; thus the start pulses, generated at 1-second intervals, indicate that any message which should be heard can immediately follow. Similarly, the stop pulses are generated at the end of the 1-second message-playing intervals (20 milliseconds or so prior to the next start pulse).

The radio altitude analog signal derived from radio transmitter and receiver 10 is also applied to the input of level detector 41. The other input to this level detector is derived from potentiometer 40 which serves as the "decision-height" selector. Depending upon the position of the center tap of the potentiometer, the potential applied to the second input of the level detector represents that altitude selected by the pilot which, when the aircraft descends below it, is to result in the generation of the "minimum" message. Whenever the radio altitude analog input drops below this level, the output of level detector 41 goes high (and remains high until the aircraft ascends above the decision height) to control the generation of a single message "minimum".

Similarly, the outputs of level detectors 53 and 54 are high when the aircraft is below respective altitudes of 2000 feet and 1000 feet. When either output first goes high during a landing approach, the "terrain" message is heard as will be described below.

The ratio altitude analog signal is also applied to the input of signal linearizer 11. As is known in the art, a typical radio altitude analog signal is non-linear, the rate of increase of the signal as a function of altitude decreasing with increasing altitude. Any conventional signal linearizer may be used to convert the analog input signal to an analog output signal which is a linear function of altitude. The analog altitude signal at the output of signal linearizer 11 is applied to the input of analog-to-digital converter 19. The converter provides two outputs, up-dated every 0.4 seconds, which represents the "tens" and "hundreds" digits of the overall altitude. (Typically, each of the outputs consists of a 4-bit BCD signal.) The two signals are applied to the inputs of a conventional display driver 20 whose outputs drive a display 21, such as that shown in the above-identified Argentieri et al. patent. It should be noted that the "units" digit of the display is always 0; it is only the tens and hundreds digits which are changed. There is no need to provide a display whose resolution is greater than 10 feet.

The "tens" digit indication at the output of A/D converter 19 is applied to the input of 3-out-of-10 decoder 5. This decoder has three outputs, the potential of each of which is high whenever a respective "tens" digit (0, 1 or 2) is represented at the input of the decoder. The three outputs are applied to inputs of OR gate 6. Thus the output of the OR gate is high whenever any one of the three decoder outputs is high. Capacitor 7, diode 8 and resistor 9 function as a differentiator so as to generate a short positive pulse whenever one of the decoder outputs first goes high. The capacitor charges and only one short pulse (referred to as the "zero-crossing" pulse) is generated for as long as at leat one of the three decoder outputs remains high, the pulse occurring when the first of the 3 outputs goes high. Thus even though one of the decoder outputs may go low, another zero-crossing pulse is not generated if another of the three decoder outputs goes high at the same time. It is in this way that a single zero-crossing pulse is generated on conductor 111 whenever the aircraft enters the "30-foot range" which is "above" one of the "hundreds" levels. (The terms "30-foot range" and "above" should not be taken literally. Because A/D converter 19 switches its "tens" output from 3 to 2 when the altitude drops to 24 feet above a "hundreds" level, and switches its "tens" output from 0 to 9 when the altitude drops to 94 feet above the next lowest "hundreds" level, the zero-crossing pulse is actually generated when the aircraft is somewhere between 5 feet below and 24 feet above a "hundreds" level). As long as the aircraft remains within this range, no other zero-crossing pulse is generated, even though the "tens" digit may switch between 0, 1 and 2. It is this single zero-crossing pulse that triggers a message. (Although a zero-crossing pulse may be generated when the aircraft ascends through a "hundreds" level and one of the three decoder outputs first goes high, that does not result in the out-putting of a message because at such a time the negative-rate signal is necessarily low and the zero-crossing pulse has no effect, as will become apparent below.)

The pulse on conductor 111 is extended to the ZC input of track selector logic 50 to control the generation of a message. The reason for generating a zero-crossing pulse when the "tens" digit in the radar-altitude signal first switches to a 2 or 1, as well as a 0, is as described above. With an analog-to-digital conversion rate of 0.4 seconds, it is possible to "miss" a zero crossing if all that is looked for is a true "zero" in the "tens" position. (With faster conversion rates the "2" output of decoder 5, and even the "1" output, may not be necessary.)

The analog altitude signal at the output of signal linearizer 11 is applied to the input of each of buffer amplifiers 25 and 26. The start pulses on conductor 101 are extended to the input of divide-by-four circuit 22 (which is simply two flip-flops in series), so that pulses at the output of circuit 22 are generated at the rate of one every four seconds. Each of these pulses triggers the operation of sample-and-hold circuit 27 which samples the altitude signal and then holds that sample at its output for the next four seconds. The output of the sample-and-hold circuit is applied to the plus input of comparator 28. The instantaneous altitude signal, at the output of amplifier 25, is applied to the minus input of the comparator. The output of the comparator is positive whenever the potential at the plus input is greater than the potential at the minus input by an amount which represents a 1-foot difference between the previously taken sample and the instantaneous level represented at the minus input.

It should be noted that even during a steep descent the output of the comparator is not always high. Every four seconds, when a new sample is taken, the two inputs to the comparator are necessarily equal. Thus the comparator output goes low, and it is only as the aircraft continues to descend, after the signal at the minus input of the comparator drops sufficiently below the level held at the plus input, that the comparator outputs goes high again. However, the changes in the comparator output are smoothed so that the negative-rate signal on conductor 36 persists.

Resistor 31 is of much greater magnitude than resistor 30. Whenever the output of the comparator is high, diode 29 conducts and the parallel impedance of resistors 30 and 31 is relatively small. These resistors, together with capacitor 32, comprise an integrator and the capacitor rapidly charges. Saturating amplifier 34 generates a two level output. As long as the voltage across capacitor 32 exceeds a minimum level, the output of amplifier 34 is high; otherwise, the output is at ground potential. Thus as soon as the output of comparator 28 goes high, capacitor 32 charges almost instantaneously and OR gate 35 operates. Conductor 36 (NEGATIVE RATE) goes high in potential to indicate that should the system register the need to render a numerical-value announcement, it may be made inasmuch as the aircraft is descending.

At 4-second intervals, the output of comparator 28 goes low as described above. AT this time diode 29 is reverse-biased, and capacitor 32 discharges through relatively largemagnitude resistor 31. It requires 1.5 seconds after the comparator output goes low before the capacitor discharges sufficiently so as to cause the output of saturating amplifier 34 to go low. Since during a normal descent the aircraft drops 1 foot within 1.5 seconds, the output of comparator 28 goes high before amplifier 34 turns off and the negative-rate signal remains high continuously. The only time that the negative-rate signal goes low is when 1.5 seconds have gone by without the instantaneous altitude having been less than the previously taken sample by 1 foot. (Diode 33 at the input of amplifier 34 serves to clamp the input of the amplifier to ground to prevent reverse polarity. Similar remarks apply to clamping diode 8 in the differentiator circuit at the output of decoder 5, and also to clamping diode 43 included in the differentiator circuit at the output of minimum level detector 41. Although several of the other differentiators in the system are shown only as blocks, it is to be understood that they are comparable to those at the outputs of decoder 5 and level detector 41.)

As described above, level detectors 41, 53 and 54 energize their outputs when the aircraft descends below respective decision-height, 2000-foot levels and 1000-foot levels. In each case, only a single announcement is generated. In a sense, the "terrain" announcements and the "minimum" announcement are like the numerical-value announcements because they represent altitude levels (in one case a decision height selected by the pilot, and in the other either 1000 feet or 2000 feet). But the "terrain" and "minimum" announcements are made whether or not the output of amplifier 34 is high. These announcements, especially the "minimum" announcement, are so important that they should be made even if the negative-rate signal is not otherwise generated (e.g., for a very slow rate of descent). The pilot should always be altered to the fact that the aircraft is below the decision height.

For this reason, when any one of detectors 41, 53 or 54 operates, the potential of the NEGATIVE RATE conductor 36 is caused to go high regardless of the operation of comparator 28. The output of each of level detectors 41, 53 and 54 is extended to the input of a respective one of differentiators 55, 56 and 57. Each differentiator generates a short positive pulse as soon as the respective level detector operates. The outputs of the three differentiators are extended through OR gate 58 to the input of one-shot multivibrator 37. Thus whenever one of the level detectors first operates, the multivibrator is triggered and its output goes high. The positive potential at the multivibrator output is extended through OR gate 35 to create an artificial negative-rate indication. The period of one-shot multivibrator 37 is 1.5 seconds. In order for any message (except "glide-slope") to be generated, as will be described below, the NEGATIVE RATE signal must be present at the start of a message-playing interval, i.e., with the generation of a start pulse on conductor 101. Since message-playing cycles occur at 1-second intervals, the multivibrator period must be greater than 1 second to ensure that conductor 36 is high when the next start pulse is generated.

Track selector logic 50 controls the generation of the twelve messages on conductors 116, 117 and 118, as will be described in detail below. Conductor 116 is connected to the G/S output and the "glideslope" message is applied over this conductor when it is generated. Similarly, the "minimum" messsage at the M output of the track selector logic is applied to conductor 117. The "terrain" message, or one of the nine numerical-value messages, depending on which one is to be out-putted, is applied at the N output of the track selector logic to conductor 118.

Track selector logic 50 includes several inputs. One of these, the ZC input, has already been dscribed; whenever the zero-crossing pulse on conductor 111 is generated, it is applied to the ZC input of the track selector logic. As will be described below, a reset pulse on conductor 112 is applied to the R input of the track selector logic, this pulse serving to reset certain flip-flops. The several other inputs to the track selector logic are signals which represent the need to make respective announcements.

When either of level detectors 53 or 54 first operates, the positive pulse aat the output of the respective differentiator 56 or 57 is extended through OR gate 59 and over conductor 113 to the T (terrain) input of the track selector logic. As will be described below, the positive pulse sets a flip-flop which then controls the generation of the "terrain" announcement. After level detector 53 operates to set the flip-flop and the "terrain" message is heard, the flip-flop is reset (by the pulse applied over conductor 112 to the R input). The flip-flop remains reset until level detector 54 operates, at which time the new positive pulse extended through OR gate 59 sets the flip-flop once again so that the "terrain" message can be repeated.

The "hundreds" output of analog-to-digital converter 19 is extended to the input of one-out-of-nine decoder 72. This decoder energizes one of its nine outputs (corresponding to the messages "900", "800", . . . "100") depending upon the digit value in the hundreds position of the output of converter 19. The nine outputs of decoder 72 are extended over cable 114 to nine "N" inputs of the track selector logic. After one of the decoder outputs goes high, the next zerocrossing pulse sets a respective flip-flop in the track selector logic which then controls the out-putting of a respective numerical message. (As soon as the message is heard, the reset pulse applied to the R input of the track selector logic resets the flip-flop; the flip-flop is not set once again by the positive potential which may remain on the respective decoder output unless another zero-crossing pulse is generated.)

The G/S DEVIATION output from glideslope receiver 18 is applied to the input of level detector 92 and the input of level detector 93. The former circuit energizes its output only when the glideslope deviation exceeds a preselected upper limit. The latter detector energizes its output whenever the glideslope deviation exceeds a lower limit. Level detector 93 is always operated when level detector 92 is operated, although level detector 92 does not always operate along with level detector 93. Thus level detector 93 always operates whenever the glideslope message is to be heard, and its output is connected to one input of AND gate 94. A second input of the AND gate is connected through manually-operated switch 89 to the G/S VALID signal at the output of the glideslope receiver. The "glideslope" message is heard only when the glideslope receiver output is valid, i.e., when the sound input of AND gate 94 is energized. Switch 89 is provided so that the pilot can manually disable the "glideslope" announcements. There are certain times, even when the G/S VALID signal is present, that there may be a reason for inhibiting "glideslope" messsages. For example, the pilot may diliberately drop below the glideslope path in order to avoid clouds. Since he is not attempting to follow the glideslope path, the repetitive "glideslope" annoucements can only be annoying and the pilot is given the option of inhibiting the announcements.

There may be other reasons for also inhibiting the "glideslope" announcements. For example, the conventional "tune-to-localizer" signal generated elsewhere in the aircraft can be used to inhibit the generation of "glideslope" announcements, and this is represented symbolically by dashed line 95; if the TUNE-TO-LOC signal is not present, AND gate 94 is not operated and the "glideslope" messages are not heard. (As is known in the aircraft industry, in the absence of a TUNE-TO-LOC signal, a G/S VALID signal is sometimes artifically generated, even if the glideslope receiver is not operating properly, in order to control other parts of the overall display. Thus the presence of a G/S VALID signal is not necessarily indicative of the proper operation of the glideslope receiver, and the absence of the TUNE-TO-LOC signal may be used to disable the operation of gate 94, even though the G/S VALID signal is present.)

Whenever gate 94 operates, i.e., there is a need for a "glideslope" message, the output of the gate is extended over conductor 115 to the G/S input of the track selector logic. Since the "glideslope" messages are generated continuously, the positive potential on conductor 115 does not set a flip-flop when the gate output first goes high. Instead, the positive potential on conductor 115 controls the continuous generation of "glideslope" messages, as will be described below.

The remaining input to track selector logic 50 is the M input to which conductor 110 is connected. This conductor is high in potential when the "minimum" messsge is to be generated. As will be described below in connection with the track selector logic, any zero crossing which occurs during the play of a message does not result in the selection of another numerical-value message for play. But even though a numerical-value message may be in progress when minimum level selector 41 operates, the "minimum" messsage is generated at the end of the message in progress. Circuitry is provided to "remember" the operation of level detector 41, even should it occur during the out-putting of a numerical-value message, so that the "minimum" message can be played during the next message-playing cycle.

Before explaining how the need for a "minimum" announcement is "remembered," it will be helpful to review the circuitry which controls the out-putting of the several announcements other than "glideslope." The "audio enable" flip-flop 67 is placed in the 1 state whenever a high potential appears at its S input. It is switched back to the 0 state when a positive pulse is applied to its R input (but only if the S input is not high at that time). The three inputs to OR gate 62 are derived from zero-crossing conductor 111 (to take into account the numerical-value announcements), the output of OR gate 59 (to take into account a descent below the 2000-foot level and the 1000-foot level), and the Q output of flip-flop 45 (to take into account a descent below the decision height). The output of OR gate 62 is extended to one input of AND gate 66, the other input to which is connected to the NEGATIVE RATE conductor 36. This conductor is high whenever a true descent is detected by the sample-and-hold and related circuits, or whenever one of level detectors 41, 53 or 54 operates. (It will be recalled that while numerical announcements are made only if a descent condition is detected, the "terrain" and "minimum" announcements are made whenever the respective level detectors operate by "artificially" generating a negative-rate signal). When both inputs to AND gate 66 are energized, the output goes high to set the audio enable flip-flop 67 in the 1 state. The $\bar{Q}$ output of the flip-flop goes high and thus enables one input of AND gate 69. Another input to this gate is connected to the NEGATIVE RATE conductor 36 which is high whenever one of the announcements is to be made. The third input to gate 69 is connected to start conductor 101. Thus at the start of the next 1-second message-playing cycle which follows the initial operation of OR gate 62, a positive pulse is applied to the set input of audio gate flip-flop 68, and its $\bar{Q}$ output goes high.

The $\bar{Q}$ output of the audio gate flip-flop is extended to the control input of audio analog switch 76. The outputs of minimum analog switch 74 and number analog witch 75 are both tied together at the input of audio analog switch 76. Analog switch 74 is turned on whenever a "minimum" announcement is to be made, and analog switch 75 is turned on whenever a numerical announcement is to be made. Only one of the two analog switches operates to extend the respective message through analog switch 76 and output amplifier 78 to speaker 79. As will be described below, whenever analog switch 76 is operated, analog switch 73 is held off so that "glide-slope" announcements are not also extended to the input of amplifier 78. Audio analog switch 76 is turned on at the start of each message-playing cycle during which an announcement is to be made, the announcement being preceded by the generation of a start pulse on conductor 101 which sets audio gate flip-flop 68 in the 1 state.

At the end of the announcement, a stop pulse appears on conductor 102, the stop pulse being applied to the reset input of flip-flop 68. At this time the $\bar{Q}$ output of the flip-flop goes low, and audio analog switch 76 is turned off.

Inverter 82 functions to invert the pulse at the output of the audio gate flip-flop 68 so that each pulse, of a little under 1-second in duration, at the output of the inverter is a negative pulse. Differentiator 83 differentiates this pulse to derive a negative spike at the start of the message-playing cycle and a positive spike at the end of it. Only the positive spike is extended through OR gate 84 over conductor 112 to the reset input of track selector logic 50. The $\bar{Q}$ output of audio gate flip-flop 68 is connected to the reset input of audio enable flip-flop 67. Thus while the stop pulse itself resets audio gate flip-flop 68, audio enable flip-flop 67 is reset at the beginning of the outputting of a message, a message being out-putted during the time that the $\bar{Q}$ output of audio gate flip-flop 68 is high.

If the NEGATIVE RATE conductor 36 has gone low between the time that audio enable flip-flop 67 was initially set in the 1 state and the generation of a stop pulse on conductor 102 (during this time a message is not being outputted because audio gate flip-flop 68 is in the 0 state and its $\bar{Q}$ output is low), if the inverting input of AND gate 80 is high, the stop pulse on conductor 102 at the end of the message-playing cycle is extended through gate 80 and the other input of OR gate 84 to the reset input of the track selector logic. Thus the track selector logic is reset by a stop pulse before the start pulse which would otherwise start an announcement; consequently, no message is heard. If the negative-rate signal is no longer present, there is no need for a message. This sequence cannot take place if the message to be heard is "terrain" or "minimum" because one-shot multivibrator 37 maintains NEGATIVE RATE conductor 36 high in potential for more than one second, so that following the setting of enable flip-flop 67 in the 1 state, the negative-rate signal must still be present when the next stop pulse is generated. But in the event the announcement to be out-putted is one of the numerical values, should the negative-rate signal go low prior to the generation of the first stop pulse which occurs after the setting of flip-flop 67 in the 1 state, as a result of the output of comparator 28 having remained low for 1.5 seconds, a numerical-value announcement is not heard.)

As described above, whenever a numerical-value message is to be played, a pulse appears at the ZC input of track selector logic 50. One of the nine N inputs from decoder 22 is also high. This condition selects one of the nine numerical-value messages for play and out-putting over conductor 118. Although the disc containing the announcements rotates continuously and the playback circuits associated with the numerical-value announcement to be heard are turned on as soon as the ZERO CROSSING conductor 111 is pulsed, the only playback signal which is heard is that which is bounded by the approximately 1-second pulse at the $\bar{Q}$ output of audio gate flip-flop 68 since it is only when the $\bar{Q}$ output is high that audio analog switch 76 is turned on. And since it is the start pulse and the stop pulse which determine the bounds of the pulse at the $\bar{Q}$ output of the flip-flop, these pulses are generated from the same disc which contains the messages, and the two pulses on the disc bracket all of the messages, it is apparent that analog switch 76 passes a numerical-value message only from the start of the message through its end. At the end of the message, the pulse at the output of OR gate 84 is applied over conductor 112 to the reset input of the selector logic, and resets the circuits in the track selector logic which controlled the out-putting of the particular numerical value-message which was heard.

When the "terrain" message is to be played, the initial positive pulse on conductor 113 applied to the T input of the track selector logic sets a respective flip-flop in the logic for turning on the playback circuits associated with the "terrain" recording. Although these circuits turn on immediately with the operation of one of level detectors 53 or 54 (independently of the presence of a zero-crossing pulse), once again it is the pulse at the $\bar{Q}$ output of audio gate flip-flop 68 which turns on analog switch 76 only at the start of the "terrain" announcement and turns off the switch at the end of the announcement. The "terrain" announcement is applied by the track selector logic to conductor 118, since "terrain" and "numerical-value" announcements are treated in the same way. The playback circuits for the "terrain" recording are turned off at the end of the announcement by the reset pulse on conductor 112.

The track selector logic controls the read-out of the "minimum" announcement and its application to conductor 117 whenever conductor 110 is high in potential. The "minimum" announcement is transmitted through "minimum" analog switch 74 to the input of audio analog switch 76. As will be described shortly, whenever there is a need for a "minimum" announcement, analog switch 74 operates to the exclusion of analog switch 75. Once again, the message is actually heard only during the time that audio analog switch 76 is turned on, and thus also in the case of the "minimum" announcement, it is the pulse at the $\bar{Q}$ output of audio gate flip-flop 68 which renders the announcement audible.

As will be described below in connection with the track selector logic 50, in the event a zero crossing corresponding to a descent through a particular level is detected while an announcement corresponding to the next higher level is being out-putted, the newly-detected zero crossing is not "registered" by the track selector logic. For example, if the "700" announcement is being played while the "600" zero crossing is detected, the "600" playback circuits in the track selector logic are not turned on. The aircraft must be descending at so fast a rate that a zero crossing at the "500" level may well be detected shortly. Rather than to risk the possibility of delaying the "500" announcement in favor of the "600" announcement, the "600" announcement is not played at all; the system is primed for out-putting the "500" announcement at the earliest possible time. But the "minimum" announcement is the most important announcement of all. Thus, if the minimum level detector 41 operates during the play of one of the numerical-value announcements, the "minimum" announcement is not inhibited simply because a descent below the decision height was detected during the play of the numerical-value announcement. Flip-flops 45 and 48, and the related circuits, are provided to ensure that the "minimum" announcement is heard at the start of the next full message-playing cycle, even should one of the numerical-value messages be in progress at the time minimum level detector 41 operates.

When the level detector operates and its output goes high, the positive step is differentiated by capacitor 42 and resistor 44, and flip-flop 45 is set in the 1 state. Since the Q output of the flip-flop is extended to one input of OR gate 62, and conductor 36 is always high for 1.5 seconds following the operation of level detector 41, AND gate 66 operates to set audio enable flip-flop 67 in the 1 state. (The flip-flop may already be in the 1 state if a numerical-value announcement is being played). At the end of the one-second message-playing cycle in progress, OR gate 84 may apply a pulse at its output depending upon whether or not a message was played, that is, depending on whether audio gate flip-flop 68 was in the 1 state. But even if a numerical-value message was being played and a reset pulse is generated at the output of OR gate 84, that reset pulse has no effect on the system. Although the playback circuitry associated with the completed numerical-value announcement is reset, the circuitry for controlling read-out of a "minimum" announcement is independent of the reset pulse and consequently the reset pulse has no effect on it.

The $\bar{Q}$ output of flip-flop 45 is connected to the inverting input of gate 47. The other input of the gate is connected to the output of AND gate 65. The first start pulse on conductor 101 following the setting of flip-flop 45 is extended through gate 65 to this other input of gate 47. Since at this time both inputs of the gate are high, the output of the gate goes high to set flip-flop 48 in the 1 state. The $\bar{Q}$ output of this flip-flop goes high and extends a high potential through OR gate 46 to the reset input of flip-flop 45. Thus flip-flop 45, whose function is to "remember" the need for a "minimum" announcement from the time that level detector 41 first operates until the end of the message-playing cycle in progress, is reset to the 0 state. (To be sure that flip-flop 45 remains in the 0 state except when a "minimum" announcement is required, the other input to OR gate 46 is connected to the output of gate 60. AS long as the output of minimum level detector 41 is low, that is, the aircraft is above the decision height, the inverting input of gate 60 is high. Consequently, every stop pulse on conductor 102 is extended through gate 60 and OR gate 46 to the reset input of flip-flop 45. This ensures that even if flip-flop 45 is set in the 1 state by accident, for example, as the result of circuit noise, the first stop pulse which next occurs resets it before the following start pulse can control the setting of flip-flop 48. It is only after minimum level detector 41 has operated and gate 60 is disabled, that the next stop pulse is not applied to the reset input of flip-flop 45, and the flip-flop is reset only after its 1 state has been transfrred to flip-flop 48.)

When flip-flop 48 has been switched to the 1 state its $\bar{Q}$ output goes low. At this time, the respective inverting input of OR gate 49 is energized so that conductor 110 goes high. It is when this conductor is high that the playback circuits in the track selector logic for controlling the "minimum" announcement are operated. Although it is the start pulse itself which controls flip-flop 48 to switch to the 1 state, it is preferable not to turn on the selector logic circuits associated with the "minimum" announcement by the start pulse itself. This might result in a "click" being heard. For this reason, the $\bar{Q}$ output of flip-flop 45 is connected to the other inverting input of gate 49. As soon as flip-flop 45 is switched to the 1 state, conductor 110 goes high to turn on the playback circuits in the track selector logic associated with the "minimum" announcement. Thereafter, when flip-flop 45 is switched back to the 0 state and flip-flop 48 is switched to the 1 state, it is the $\bar{Q}$ output of the latter flip-flop which maintains the high potential on conductor 110. It is thus apparent that the playback circuits of track selector logic 50 associated with the "minimum" announcement are turned on immediately upon the operation of level detector 41, even though one of the numerical-value announcements may be in progress. However, it is analog switches 74 abd 75 which allow the numerical-value announcement in progress to be heard to its completion, before the "minimum" announcement is heard.

The control input of number analog switch 75 is connected to the $\bar{Q}$ output of flip-flop 48, and the control input of minimum analog switch 74 is connected to the Q output of flip-flop 48. As long as the aircraft is above the decision height, the Q output of flip-flop 48 is low so that minimum analog switch 74 is held off, and the $\bar{Q}$ output of flip-flop 48 is high so that number analog switch 75 is held on. As soon as the descent through the decision height is detected, flip-flop 45 is set in the 1 state. This may occur in the middle of a message-playing cycle. But because neither of the outputs of flip-flop 45 controls the operation of analog switches 74 and 75, any numerical-value announcement in progress is played to its completion. It is only at the end of the message-playing cycle in progress (whether or not a numerical-value announcement is being made), that flip-flop 48 is set in the 1 state. It is at this time that minimum analog switch 74 is turned on and number analog switch 75 is turned off. Consequently, the "minimum" announcement is extended through switches 74 and 76 to be heard over speaker 79.

At the end of the "minimum" announcement it is necessary to reset flip-flop 48. The 1-second pulse at the $\overline{Q}$ output of audio gate flip-flop 68 is differentiated by resistor 63 and capacitor 64. The negative spike at the end of the pulse, which appears at the inverting reset input of flip-flop 48, resets the flip-flop in the 0 state. Thus at the end of the "minimum" announcement, flip-flop 48 is reset in the 0 state and the system is returned to its quiescent condition. It shuld be noted that if a numerical-value message is in progress when level detector 41 first operates, at the end of that message a reset pulse is applied to flip-flop 48. But that reset pulse has no effect since flip-flop 48 is still in the 0 state. It is the next start pulse which sets flip-flop 48 in the 1 state that controls out-putting of the "minimum" message.

As described above, gate 94 is operated for as long as there is a glideslope deviation (assuming that the G/S VALID signal is present and that there is no other reason for disabling "glideslope" announcements). The output of AND gate 94 is extended over conductor 115 directly to the G/S input of track selector logic 50. For as long as gate 94 is operated, the playback circuits in the track selector logic for controlling read-out of the "glideslope" announcements are enabled, each announcement being extended over conductor 116 to the input of glideslope analog switch 73. Depending on the extent of the glideslope deviation, the "glideslope" announcements are heard every second or every other second. In the case of a large deviation, the output of level detector 92 is high to enable AND gate 85. Start conductor 101 is connected to the other input of this gate, and consequently every start pulse is extended through gate 85 and OR gate 88 to the set input of flip-flop 90. Thus every start pulse controls the setting of the flip-flop in the 1 state. Since stop conductor 102 is connected to the reset input of the flip-flop, the flip-flop remains in the 1 state with its $\overline{Q}$ output high only for the duration of the slightly under 1-second interval required for the playing of a "glideslope" message. In a similar manner, gate 87 also passes start pulses for setting flip-flop 90 in the 1 state. However, gate 87 is enabled by level detector 93 and due to the provision of divide-by-two circuit 86, only every other start pulse is extended through gate 87 for setting the flip-flop in the 1 state. It is only when the flip-flop 90 is in the 1 state that a "glideslope" announcement may be heard, and it is thus apparent that in the case of a large glideslope deviation an announcement can be heard every second, while in the case of a small glideslope deviation an announcement can be heard only in every other message-playing cycle.

The output of gate 81 is connected to the control input of glideslope analog switch 83. It is only when the outut of gate 81 is high that "glideslope" announcements are made. These announcements are extended through attenuator 77 to the input of amplifier 78. The attenuator controls play of the announcements at two levels, depending on whether there is a large deviation or a small deviation. Attenuator 77 is normally "on" so that the "glideslope" announcements are played at a relatively low level. But if level detector 92 operates to indicate a large deviation, a high potential is applied to the inverting input of the attenuator. At this time the attenuator is turned off (i.e., it passes a signal without attenuating it) and the "glideslope" announcements are played at a higher level. Thus in the case of large deviations, not only are the announcements made more frequently, but they are also louder.

The "glideslope" announcements have the lowest priority, and they are inhibited if the "minimum" or one of the numerical-value announcements is to be made. It is by holding G/S analog switch 73 off when one of these other announcements is to be made that the outputs of attenuator 77 and analog switch 76 can be tied together in the first place; there are never two competing signals because analog switch 73 is held off whenever one of analog switches 74 or 75 is on. It is the several inputs of gate 81 which give the "glideslope" message the lowest priority. Two of the inputs to gate 81 are the output of gate 84 and the $\overline{Q}$ output of flip-flop 90. Gate 81 can operate only when gate 94 indicates that "glideslope" announcements are required in the first place, and gate 81 is enabled by flip-flop 90 only during message-playing intervals (during either every message-playing interval or every other one, depending on whether or not level detector 92 is operated). The inverting input of gate 81 is connected to $\overline{Q}$ output of audio gate flip-flop 68. The $\overline{Q}$ output of the flip-flop is high whenever one of the numerical-value announcements or the "minimum" announcement is being made. Thus if one of these announcements is being made, and the $\overline{Q}$ output of flip-flop 68 is high, analog switch 73 is held off. It is only if one of the other announcements is not being made and gate 81 is not disabled at its inverting input, that the "glideslope" messages can be heard.

Lastly, it will be recalled that the "glideslope" announcements are not made when the aircraft is below the decision height (the pilot may deliberately avoid the glideslope path by dropping down below clouds), or when it is above the 1000-foot level. The outputs of minimum level detector 41 and 1000-foot level detector 54 are connected to respective inputs of gate 61. If level detector 41 has operated to indicate that the aircraft is below the decision height, the high potential at the inverting input of gate 61 holds the output low to disable gate 81. If level detector 54 has not operated, i.e., the aircraft is above 1000 feet, its low output is extended through gate 61 to disable gate 81.

Figure 5:
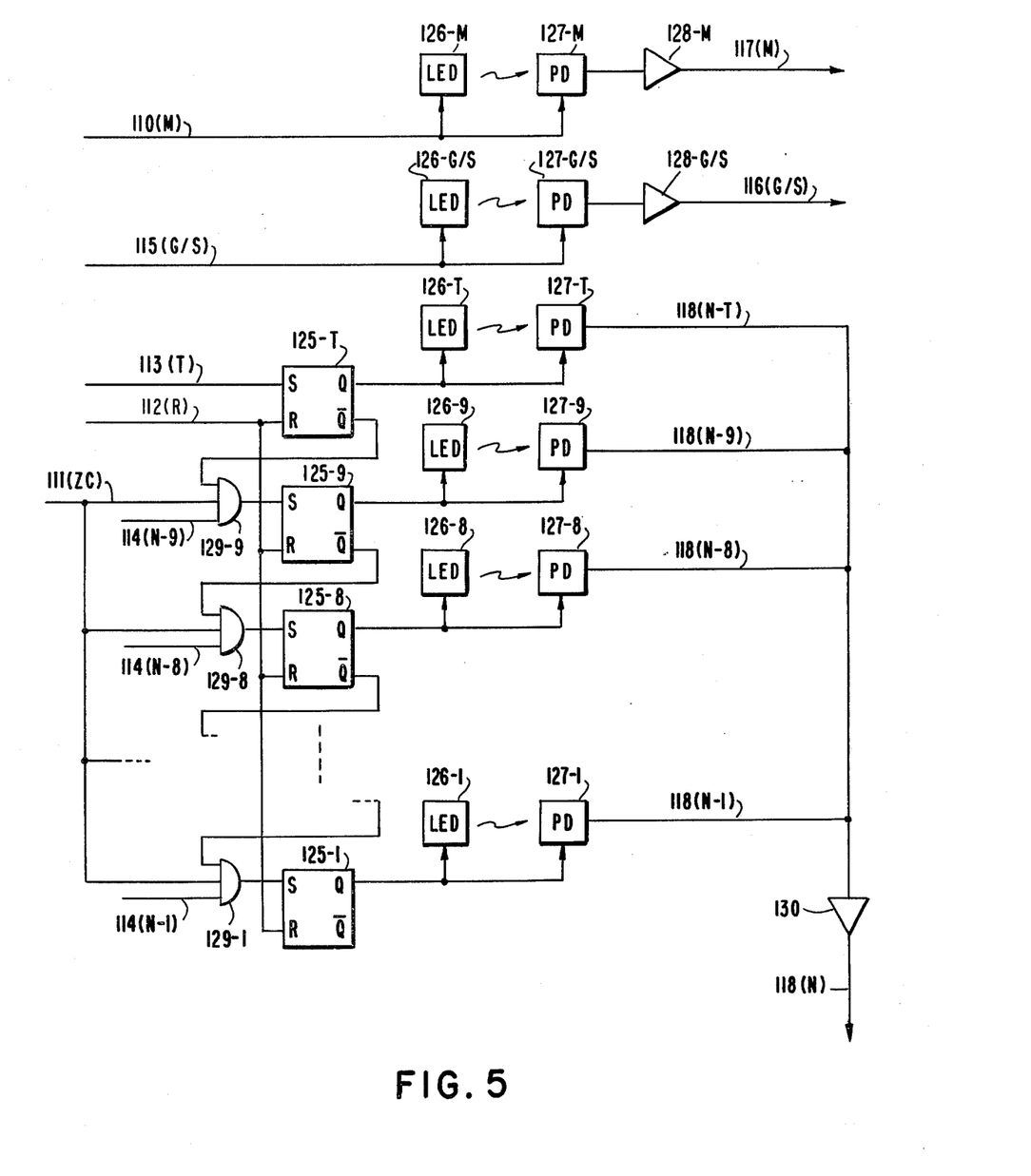
FIG. 5 depicts the circuitry included in the track selector logic block 50 of FIG. 3.

The track selector logic 50 is shown in detail on FIG. 5. Associated with each of the 12 message tracks are a light emitting diode element and a photo-detector element. (The mechannical arrangement will be described below in connection with FIG. 6.) Whenever a light-emitting diode is turned on, a light beam is extended through the respective track to the respective photo-detector element. The light beam is modulated by the recording in the respective track, the output of each of the twelve photo-detectors thus being an analog signal representative of a respective announcement.

The 13th track is a timing track, and the respective light emitting diode and photo-detector element are not shown in FIG. 5. These elements are always enabled since the timing pulses, as well as the start and stop pulses, must be derived continuously while motor 160 is running.

As discussed above, conductor 110, connected to the M input of the track selector logic, is high in potential from the time that minimum level detector 41 first operates until the end of the next message cycle. The conductor is thus high for at least 1 second and up to a maximum of two seconds. A high potential on conductor 110 energizes both light-emitting diode 126-M and photo-detector 127-M. The analog signal at the output of the photo-detector is amplified by amplifier 128-M and applied to conductor 117 at the M output of the track selector logic. The analog signal on conductor 117 thus represents the last part of one "minimum" message, depending upon when during the one-second message-cycle in progress level detector 41 first operates, followed by a full "minimum" message. It is flip-flop 48 which controls the out-putting of only the complete "minimum" message during the first complete message-playing cycle which occurs following the operation of minimum level detector 41.

Similarly, conductor 115, connected to the G/S input of the track selector logic, is high for controlling the operation of the light-emitting diode 126-G/S and photo-detector 127-G/S whenever AND gate 94 is operated. Although an analog signal representing the word "glideslope" thus appears on conductor 116 connected to the G/S output of the track selector logic for as long as AND gate 94 is operated, it is gate 81 which allows the message to be heard only when it is called for.

It will be recalled that a positive pulse is applied on conductor 113 connected to the T input of the track selector logic when the aircraft descends below the 2000-foot level and also when it descends below the 1000-foot level. Conductor 113 is connected to set input of flip-flop 125-T, and consequently this flip-flop is set in the 1 state as soon as the need for a "terrain" announcement is detected. The Q output of the flip-flop is connected to light-emitting diode 126-T and photo-detector 127-T so that an analog signal corresponding to the "terrain" message appears on conductor 118(N-T) as soon as flip-flop 125-T is set in the 1 state. The signal is amplified by amplifier 130 and applied to conductor 118, connected to the N output of the track selector logic. Although flip-flop 125-T may be set in the 1 state in the middle of one mmessage-playing cycle, the last part of the "terrain" message being played is not actually heard because audio analog switch 76 is turned on by audio gate flip-flop 68 only at the start of the next complete message-playing cycle. At the end of that cycle, the reset pulse on conductor 112, connected to the R input of the track selector logic, resets flip-flop 125-T so that light-emitting diode 126-T and photo-detector 127-T both turn off.

It will be noted that photo-detector 127-T is treated just as one of the other nine photo-detectors 127-9 through 127-1 which are associated with the nine numerical-value messages. The ten photo-detector outputs are tied together at the input of amplifier 130, and what appears on conductor 118 at the N output of the track selector logic is either the "terrain" analog signal or one of the nine numerical-value analog signals. The tying together of the photo-detector outputs is permissible because only one of the ten flip-flops 125-T through 125-1 is set in the 1 state at any one time so that only one of the photo-detectors generates an output signal at any one time. The other nine photo-detector outputs are effectively open-circuited and do not interfere with the signal being read out.

Each of the nine other flip-flops 125-9 through 125-1 has its set input connected to the output of a respective AND gate 114(N-9) through 114(N-1). One input for each of these nine AND gates is derived from a respective output of one-out-of-nine decoder 72. Thus only one of the nine flip-flops can be set at any one time, depending upon the "hundreds" digit at the output of analog-to-digital converter 19. Since a numerical-value message is to be read out only when a zero crossing is detected, the zero-crossing conductor 111 is connected to an input of each of the nine AND gates. The only AND gate which can operate, however, is tht one whose input is connected to the respective high output of decoder 72.

It is not enough, however, for one of the flip-flops to be set in the 1 state if only its respective decoder output is energized when a zero crossing is detected. The third condition required for setting one of the nine numerical-value flip-flops is that the flip-flop representing the next highest level not be set. For example, if the "900" message is being heard (flip-flop 125-9 being set) when the aircraft descends through the 800-foot level, the zero-crossing pulse on conductor 111 is not extended through AND gate 114(N-8) to set flip-flop 125-8 in the 1 state. This is because the $\overline{Q}$ output of flip-flop 125-9 is connected to a third input of the AND gate and this output is low when flip-flop 125-9 is in the 1 state. The zero crossing is "ignored." Even after the "900" message is completed, the "800" message is not played because the respective flip-flop was not set in the 1 state when the most recent zero-crossing pulse was generated. The reason for this is that described above; if the descent is so rapid that another zero crossing occurs while one of the numerical-value messages is being heard, then the system remains ready to output the next lower level announcement as soon as it becomes apparent that it is necessary (with the constraint, of course, that the out-putting of any message can begin only at the start of a message-playing cycle so that there can be a delay of up to one second following the detection of an event which is worthy of an announcement before the announcement actually begins). In this regard, it should be noted that the $\overline{Q}$ output of the "terrain" flip-flop 125-T is connected to an input of AND gate 114(N-9). The "terrain" message is treated just like one of the numerical value messages. Depending on which of the nine numerical value flip-flops is set in the 1 state, only the respective light emitting diode and photo-detector are energized and only one of the 10 "terrain" and numerical-value message signals is applied to the inpput of amplifier 130 at any given time. Just as the "terrain" message is actually first heard only at the beginning of a message-playing cycle, a selected numerical-value message is also heard starting only with the beginning of a message-playing cycle. At the end of the cycle, the respective flip-flop is reset. (It should be noted that unlike "terrain," "minimum" and numerical-value announcements, the "glideslope" announcements, although they always start at the beginning of a message-playing interval, may terminate in the middle of one of the announcements. The "glideslope" announcement is always started at the beginning of a message-playing cycle because it is always a start pulse which sets flip-flop 90 in the 1 state to enable the operation of gate 81. But the gate may be disabled in the middle of a "glideslope"announcement should gate 94 turn off or should the output of gate 61 go low. It is of little importance, however, if the last "glideslope" message in a series of "glideslope" messages is terminated in the middle.)

Figure 6:
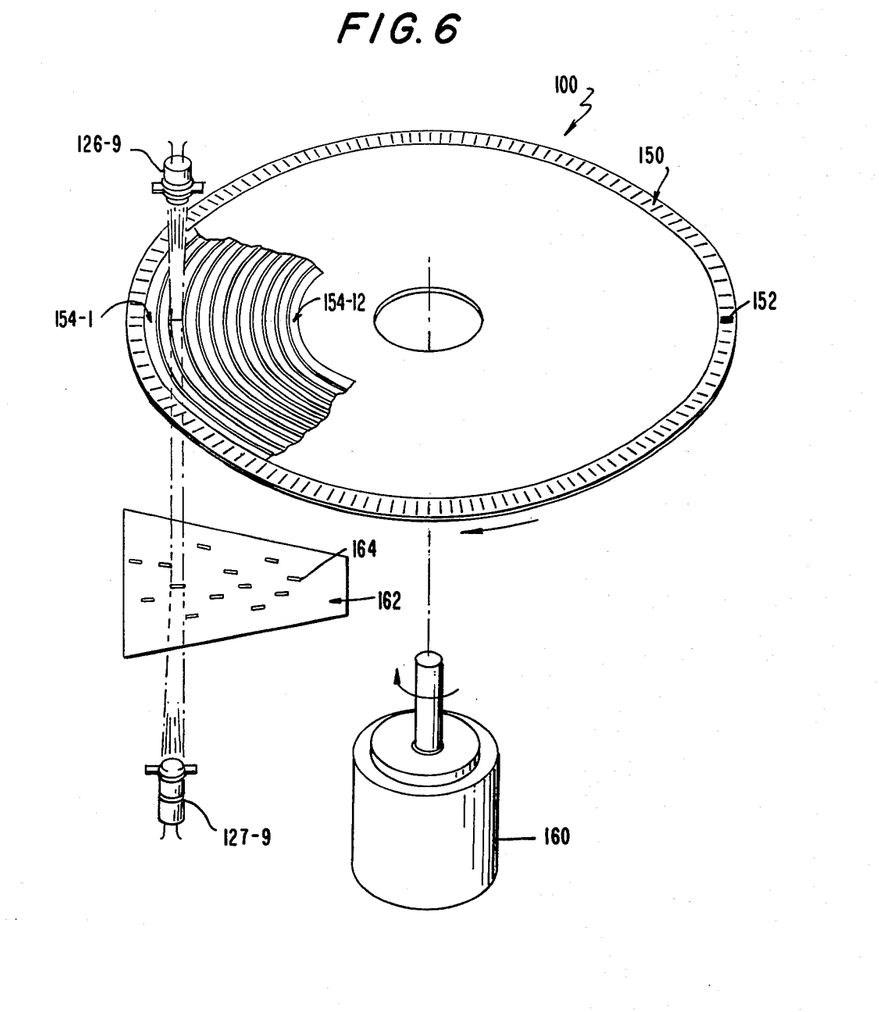
FIG. 6 depicts the message-generating sub-system used in the system of FIGS. 1–3.

FIG. 6 is an exploded view which depicts symbolically the disc 100 on which the various messages are recorded, as well as those elements asociated with it which control playback of the various messages and the generation of the timing signals. The disc 100 contains 13 tracks. On the outer track 150 there are recorded timing signals, and the 12 verbal messages are recorded on the 12 inner tracks 154-1 through 154-12. The timing track is for the most part light-transmissive, but there are 100 discrete marks recorded on it. Each of these marks is narrow, except for mark 152 which is wider. Motor 160 rotates in the direction shown when amplifier 98 (FIG. 1) is on. As the disc rotates, a light beam from a respective light-emitting diode (not shown), which beam is confined within the inner and outer bounds of the timing track, is transmitted through the track and detected by a photo-detector (not shown). The output of the photo-detector appears on conductor 103 (FIG. 1). Each of the 100 timing pulses is operated upon by phase detector 97 for controlling the speed of disc 100. The start/stop pulse generator 99 operates on the wide pulse on conductor 103 which corresponds to the wide timing mark 152 on the timing track.

In addition to the light-emitting diode and photo-detector associated with the timing track, there are twelve other pairs corresponding to those shown in FIG. 5. Only one such pair, consisting of light-emitting diode 126-9 and photo-detector 127-9, is shown in FIG. 6. Each light-emitting diode directs a narrow light beam through a respective track, the light beam being detected by the associated photo-detector. In each case, the light beam is modulated by the respective track recording.

Underneath the disc 100 a mask 162 is provided. The mask contains 13 narrow slits. Through each slit there is transmitted only a narrow slice of a respective light beam. The reason for providing the slits is that each photo-detector should respond at any instant to light transmitted through only a narrow section of the respective track. In order to reproduce the frequency spectrum pf the human voice, a frequency response of up to slightly more than 3.0 kHz is required. The poorest resolution is exhibited by the inner track, which, in the illustrative embodiment of the invention, has a circumference of approximately 3 inches. A 3.0 kHz wave recorded on a 3-inch track which rotates once per second has a physical wavelength of 0.001 inches. If the wave is to be detected, only a look through a narrow slice of it will suffice; if the "average" modulation is detected by looking at too wide a slice, the information will be completely lost. A slit having a width of 0.0003 inches in the direction of the track movement corresponds to approximately one-third of the wavelength and is sufficiently small to allow reconstruction of the recorded waveform. In the illustrative embodiment of the invention, the width of each slit is 0.0003 inches; it has been found that this is sufficiently narrow to allow all of the messages to be reconstructed.

It should be noted that the slits in mask 162 are not in line with each other along a single radius of the disc. Although it is possible to provide such a configuration, it would require the light-emitting diodes and the photo-detectors to be similarly in line with each other making them vulnerable to cross talk between tracks. In order that it not be required to mount the light-emitting diodes and photo-detectors close to each other (which also makes it difficult to gain access to any one of them), or, in the alternative, to require the use of a disc whose diameter is larger than otherwise required, the light-emitting diodes and photo-detectors are offset from each other, in positions corresponding to the locations of the slits 164 in mask 162. This simplifies mounting of the light-emitting diode and photo-detector elements. It will be apparent that with such an arrangement the beginning of the various message tracks on the disc will not line up with other along a single radius. In order to synchronize the start of any recording with the generation of the start pulse, the physical recordings have different starting locations on the disc. All that is required is that whenever the trailing edge of pulse 152 appears above the slit in mask 162 corresponding to the timing track (i.e., whenever a start pulse is generated), the leading edge of each message appear above its respective slit in the mask. The physical positions of the messages on the disc is of no importance, as long as the out-putting of any message begins at the time that a start pulse is generated (or a few milliseconds thereafter).

Figure 7:
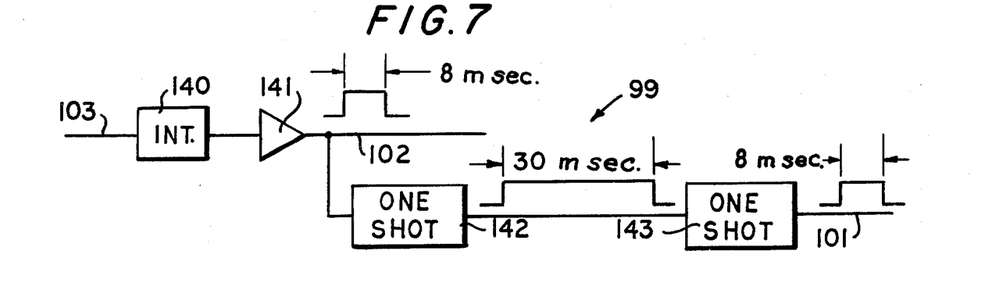
FIG. 7 depicts the circuitry included in the start/stop pulse generator 99 of FIG. 1.

As described above, start/stop pulse generator 99 operates on the wide pulse on conductor 103 (FIG. 1) which corresponds to the wide timing mark 152 on the timing track, to derive the start and stop pulses on conductors 101 and 102. The pulse generator itself is shown in FIG. 7. The incoming timing pulses on conductor 103 are integrated by integrator 140 whose output is connected to saturating amplifier 141. The amplifier output is at a high level only when the input exceeds a threshold value; otherwise, the amplifier output is low. Ninety-nine of the 100 timing pulses are so short that when each of then is integtated, the output of integrator 140 does not reach the threshold value. It is only the wide timing pulse which results in the integrator output reaching the level which causes the output of amplifier 141 to go high. The width of the timing mark on the timing track is such that an 8-millisecond stop pulse is generated at the output of the amplifier on conductor 102.

The leading edge of this pulse triggers one-shot multivibrator 142 whose output pulse is 30 milliseconds in duration. The trailing edge of this pulse triggers one-shot multivibrator 143 which then generates an 8-millisecond start pulse on conductor 101. The leading edges of the stop and start pulses are thus separated by 30 milliseconds.

Although the invention has been described with reference to a particular embodiment, this embodiment is merely illustrative of the application of the principles of the invention. For example, rather than to use an optical recording technique, successive samples of each message may be recorded in a read-only memory device. When any message is to be heard, the successive set of samples is read out serially and the analog message is reconstructed. Such a method, although less flexible, has the advantage of permitting the out-putting of a message instantaneously upon the detection of a need for it, rather than waiting up to one second for the beginning of the required message to reach its respective slit in mask 162. Thus it is to be understood that numerous modifications may be made in the illustrative embodiment of the invention and other arrangements may be devised without departing from the spirit and scope of the invention.

What we claim is:

1. A system for use in an aircraft to announce altitude-related messages, said aircraft having means for generating a signal representative of the aircraft altitude, comprising said system means for storing a plurality of verbal messages, at least several of said messages corresponding to and being indicative of respective numerical values of aircraft altitudes, means for playing a selected one of said messages, means responsive to said altitude signal for selecting one of said messages in accordance with the altitude represented by said altitude signal, said message-selecting means selecting one of the numerical-value messages responsive to said altitude signal representing an altitude within a relatively small range which includes the respective numerical value, means for deriving a negative-rate signal representative of a decreasing altitude, and means responsive to the simultaneous deviation of said negative-rate signal and the operation of said message-selecting means for controlling said message-playing means to play the selected message, said message-playing means including means for controlling the play of any numerical-value message at most once for as long as the altitude represented by said altitude signal is within the respective range.

2. A system in accordance with claim 1 wherein said at least several messages represent altitudes measured in hundreds of feet, and said message-selecting means selects one of such messages when the altitude signal represents an altitude within a range of several tens of feet, which range is at least for the most part above the respective "hundreds" level.

3. A system in accordance with claim 1 further including means for manually selecting a "decision-height" level, means for comparing the altitude represented by said altitude signal with the decision-height level to determine when the aircraft altitude is less than the decision height level, said plurality of messages including an additional message indicative of the aircraft altitude being less than the decision-height level, and means for controlling said message-playing means to play said additional message responsive to the operation of said comparing means.

4. A system in accordance with claim 3 wherein said last-mentioned means controls the play of said additional message responsive to the operation of said comparing means independent of the derivation of said negative-rate signal.

5. A system in accordance with claim 4 wherein, in the event of the simultaneous selection for play of one of said numerical-value messages and the operation of said comparing means, said message-playing means plays said additional message.

6. A system in accordance with claim 3 wherein, in the event of the simultaneous selection for play of one of said numerical-value messages and the operation of said comparing means, said message-playing means plays said additional message.

7. A system in accordance with claim 6 wherein one of said plurality of messages is indicative of a deviation of the aircraft from the glideslope path, and means responsive to the receipt of a signal representing a glideslope deviation for controlling said message-playing means to play said glideslope-deviation message.

8. A system in accordance with claim 7 wherein, in the event of a conflict between requirements to play said glideslope-deviation message and any other of said messages, said message-playing means plays said any other of said messages.

9. A system in accordance with claim 7 further including means for controlling the rate at which said glideslope-deviation message is repeated in accordance with the magnitude of the deviation from the glideslope path.

10. A system in accordance with claim 7 further including means for controlling the sound level at which said glideslope-deviation message is played in accordance with the magnitude of the deviation from the glideslope path.

11. A system in accordance with claim 7 further including means for inhibiting the playing of said glideslope-deviation message when the altitude represented by said altitude signal is either above a preselected maximum level or below said decision-height level.

12. A system in accordance with claim 1 wherein said controlling means controls the play of any numerical-value message at most once for as long as the altitude represented by said altitude signal is within a range of several tens of feet which is at least for the most part above the respective "hundreds" level.

13. A system in accordance with claim 1 wherein said numerical-value messages represent respective altitudes in hundred-foot increments below 1,000 feet and at least one other altitude in the 1,000–2,000 foot range.

14. A system in accordance with claim 1 wherein at least several of said messages are indicative of respective altitudes in hundred-foot increments below 1,000 feet.

15. A system in accordance with claim 1 wherein one of said plurality of messages is indicative of a deviation of the aircraft from the glideslope-path, and means responsive to the receipt of a signal representing a glideslope deviation for controlling said message-playing means to play said glideslope-deviation message.

16. A system in accordance with claim 12 wherein, in the event of a conflict between requirements to play said glideslope-deviation message and any other of said messages, said message-playing means plays said any other of said messages.

17. A system in accordance with claim 15 further including means for controlling the rate at which said glide-slope-deviation message is repeated in accordance with the magnitude of the deviation from the glidescope path.

18. A system in accordance with claim 15 further including means for controlling the sound level at which said glideslope-deviation message is played in accordance with the magnitude of the deviation from the glideslope path.

19. A system in accordance with claim 15 further including means for inhibiting the playing of said glide-slope-deviation message when the altitude represented by said altitude signal is either above a preselected maximum level or below a manually selectable minimum level.

20. A system in accordance with claim 15 wherein said last-mentioned means controls the plays of said glideslope-deviation message independent of the deviation of said negative-rate signal.

21. A system in accordance with claim 1 futher including means for manually selecting a "decision-height" level, means for comparing the altitude represented by said altitude signal with the decision-height level to determine when the aircraft altitude is less than the decision height level, said plurality of messages including an additional message indicative of the aircraft altitude being less than the decision-height level, and means for controlling said message-playing means to play said additional message responsive to the operation of said comparing means.

22. A system in accordance with claim 21 wherein said last-mentioned means controls the play of said additional message responsive to the operation of said comparing means independent of the derivation of said negative-rate signal.

23. A system in accordance with claim 1 wherein said message-playing means is operative to play any message starting only at periodic message-playing intervals, and said controlling means initiates the play of a selected message only if said negative-rate signal is derived at the start of the first message-playing interval which occurs following the operation of said message-selecting means.

24. A system in accordance with claim 23 wherein said at least several messages represent altitudes measured in hundreds of feet, and said message-selecting means selects one of such messages when the altitude signal represents an altitude within a range of several tens of feet, which range is at least for the most part above the respective "hundreds" level.

25. A system in accordance with claim 24 wherein said negative-rate signal deriving means includes means for sampling periodically said altitude signal, means for comparing said altitude signal with the last-taken sample to determine a decrease in altitude since the last sample was taken, and means for generating said negative-rate signal for as long as a decrease in altitude is determined and for a short predetermined time interval thereafter.

26. A system in accordance with claim 23 further including means for inhibiting the play of any numerical-value message which is selected for play by said selecting means if it is so selected in a message-playing interval during which another numerical-value message is being played.

27. A system in accordance with claim 1 wherein said negative-rate signal deriving means includes means for sampling periodically said altitude signal, means for comparing said altitude signal with the last-taken sample to determine a decrease in altitude since the last sample was taken, annd means for generating said negative-rate signal for as long as a decrease in altitude is determined and for a short predetermined time interval thereafter.

28. A system in accordance with claim 1 further including means for inhibiting the play of any numerical-value message which is selected for play by said selecting means if it is so selected while another numerical-value messsage is being played.

29. A system in accordance with claim 1 wherein said message-storing means includes a disc having messages in the form of analog signals recorded in respective tracks, means for rotating said disc, and means for reading out a selected message from its respective track, and further including means synchronized to the rotation of said disc for establishing one message-playing interval during each rotation of said disc, said message-playing means being operative to play a selected message only during a message-playing interval.

30. A system in accordance with claim 24 wherein said message analog signals are recorded in light-modulated tracks, said disc having an additional track containing a timing signal recorded therein, and further including means for determining successive message-playing intervals from said timing signal as said disc rotates.

31. A system in accordance with claim 30 wherein said negative-rate signal deriving means includes means for sampling periodically said altitude signal, means for comparing said altitude signal with the last-taken sample to determine a decrease in altitude since the last sample was taken, means for generating said negative-rate signal for as long as a decrease in altitude is determined and for a short predetermined time interval thereafter, and means for controlling the periodic sampling of said altitude signal in accordance with the timing signal recorded on said disc.

32. A system in accordance with claim 24 wherein said negative-rate signal deriving means includes means for sampling periodically said altitude signal, means for comparing said altitude signal with the last-taken sample to determine a decrease in altitude since the last sample was taken, means for generating said negative-rate signal for as long as a decrease in altitude is determined and for a short predetermined time interval thereafter, and means for synchronizing the periodic sampling of said altitude signal with the rotation of said disc.

33. A system for use in an aircraft to announce altitude-related messages, said aircraft having means for generating a signal representative of the aircraft altitude, comprising said system means for storing a plurality of verbal messages, at least several of said messages corresponding to and being indicative of respective numerical values of aircraft altitudes, means for playing a selected one of said messages, means responsive to said altitude signal for selecting one of said messages in accordance with the altitude represented by said altitude signal, said message-selecting means selecting one of the numerical-value messages responsive to said altitude signal representing an altitude within a relatively small range which includes the respective numerical value, means responsive to said altitude signal for determining a descent of the aircraft, and means responsive to the operation of said message-selecting means during an aircraft descent for controlling said message-playing means to play the selected-message, said message-playing means including means for controlling the play of any numerical-value message at most once for as long as the altitude represented by said altitude signal is within the respective range.

34. A system in accordance with claim 33 further including means for manually selecting a "decision-height" level, means for comparing the altitude represented by said altitude signal with the decision-height level to determine when the aircraft altitude is less than the decision height level, said plurality of messages including an additional message indicative of the aircraft altitude being less than the decision-height level, and means for controlling said message-playing means to play said additional message responsive to the operation of said comparing means.

35. A system in accordance with claim 34 wherein said last-mentioned means controls the play of said additional message responsive to the operation of said comparing means independent of an aircraft descent.

36. A system in accordance with claim 38 wherein, in the event of the simultaneous selection for play of one of said numerical-value messages and the operation of said comparing means, said message-playing means plays said additional message.

37. A system in accordance with claim 34 wherein one of said plurality of messages is indicative of a deviation of the aircraft from the glideslope path, and means responsive to the receipt of a signal representing a glideslope deviation for controlling said message-playing means to play said glide-slope-deviation message.

38. A system in accordance with claim 37 wherein, in the event of a conflict between requirements to play said glideslope-deviation message and any other of said messages, said message-playing means plays said any other of said messages.

39. A system in accordance with claim 37 further including means for controlling the rate at which said glideslope-deviation message is repeated in accordance with the magnitude of the deviation from the glideslope path.

40. A system in accordance with claim 37 further including means for controlling the sound level at which said glideslope-deviation message is played in accordance with the magnitude of the deviation from the glideslope path.

41. A system in accordance with claim 37 further including means for inhibiting the playing of said glideslope-deviation message when the altitude represented by said altitude signal is either above a preselected maximum level or below said decision-height level.

42. A system in accordance with claim 33 wherein said numerical-value messages represent respective altitudes in hundred-foot increments below 1,000 feet and at least one other altitude in the 1,000–2,000 foot range.

43. A system in accordance with claim 33 wherein at least several of said messages are indicative of respective altitudes in hundred-foot increments below 1,000 feet.

44. A system in accordance with claim 33 wherein one of said plurality of messages is indicative of a deviation of the aircraft from the glideslope-path, and means responsive to the receipt of a signal representing a glideslope deviation for controlling said message-playing means to play said glideslope-deviation message.

45. A system in accordance with claim 44 wherein, in the event of a conflict between requirements to play said glideslope-deviation message and any other of said messages, said message-playing means plays said any other of said messages.

46. A system in accordance with claim 44 further including means for controlling the rate at which said glideslope-deviation message is repeated in accordance with the magnitude of the deviation from the glideslope path.

47. A system in accordance with claim 44 further including means for controlling the sound level at which said glideslope-deviation message is played in accordance with the magnitude of the deviation from the glideslope path.

48. A system in accordance with claim 44 further including means for inhibiting the playing of said glideslope-deviation message when the altitude represented by said altitude signal is either above a preselected maximum level or below a manually selectable minimum level.

49. A system in accordance with claim 44 wherein said last-mentioned means controls the play of said glideslope-deviation message independent of an aircraft descent.

50. A system in accordance with claim 33 further including means for manually selecting a "decision-height" level, means for comparing the altitude represented by said altitude signal with the decision-height level to determine when the aircraft altitude is less than the decision height level, said plurality of messages including an additional message indicative of the aircraft altitude being less than the decision-height level, and means for controlling said message-playing means to play said additional message responsive to the operation of said comparing means.

51. A system in accordance with claim 50 wherein said last-mentioned means controls the play of said additional message responsive to the operation of said comparing means independent of an aircraft descent.

52. A system in accordance with claim 33 wherein said message-playing means is operative to play any message starting only at periodic message-playing intervals, and said controlling means initiates the play of a selected message only if said determining means determines the descent of the aircraft at the start of the first message-playing interval which occurs following the operation of said message-selecting means.

53. A system in accordance with claim 33 wherein said at least several of said messages are indicative of altitudes measured in hundreds of feet, and said message-selecting means selects one of such messages when the altitude signal represents an altitude within a range of several tens of feet, which range is at least for the most part above the respective "hundreds" level.

54. A system in accordance with claim 53 wherein said determining means includes means for sampling periodically said altitude signal, means for comparing said altitude signal with the last-taken sample to verify a decrease in altitude since the last sample was taken, and means for determining an aircraft descent for as long as a decrease in altitude is verified and for a short predetermined time interval thereafter.

55. A system in accordance with claim 33 wherein said determining means includes means for sampling periodically said altitude signal, means for comparing said altitude signal with the last-taken sample to verify a decrease in altitude since the last sample was taken, and means for determining an aircraft descent for as long as a decrease in altitude is verified and for a short predetermined time interval thereafter.

56. A system in accordance with claim 33 wherein said message-storing means includes a disc having messages in the form of analog signals recorded in respective tracks, means for rotating said disc, and means for reading out a selected message from its respective track, and further including means synchronized to the rotation of said disc for establishing one message-playing interval during each rotation of said disc, said message-playing means being operative to play a selected message only during a message-playing interval.

57. A system in accordance with claim 56 wherein said message analog signals are recorded in light-modulated tracks, said disc having an additional track containing a timing signal recorded therein, and further including means for determining successive message-playing intervals from said timing signal as said disc rotates.

58. A system in accordance with claim 57 wherein said determining means includes means for sampling periodically said altitude signal, means for comparing said altitude signal with the last-taken sample to verify a decrease in altitude since the last sample was taken, means for generating said negative-rate signal for as long as a decrease in altitude is determined and for a short predetermined time interval thereafter, and means for controlling the periodic sampling of said altitude signal in accordance with the timing signal recorded on said disc.

59. A system in accordance with claim 56 wherein said determining means includes means for sampling periodically said altitude signal, means for comparing said altitude signal with the last-taken sample to verify a decrease in altitude since the last sample was taken, means for generating said negative-rate signal for as long as a decrease in altitude is determined and for a short predetermined time interval thereafter, and means for synchronizing the periodic sampling of said altitude signal with the rotation of said disc.

60. A system in accordance with claim 56 further including means for inhibiting the play of any numerical-value message which is selected for play by said selecting means if it is so selected in a message-playing interval during which another numerical-value message is being played.

61. A system in accordance with claim 33 further including means for inhibiting the play of any numerical-value message which is selected for play by said selecting means if it is so selected while another numerical-value message is being played.

* * * * *